No. 838,584. PATENTED DEC. 18, 1906.
M. B. REACH.
ROPE CONNECTION FOR GYMNASIUM APPARATUS, &c.
APPLICATION FILED SEPT. 24, 1906.
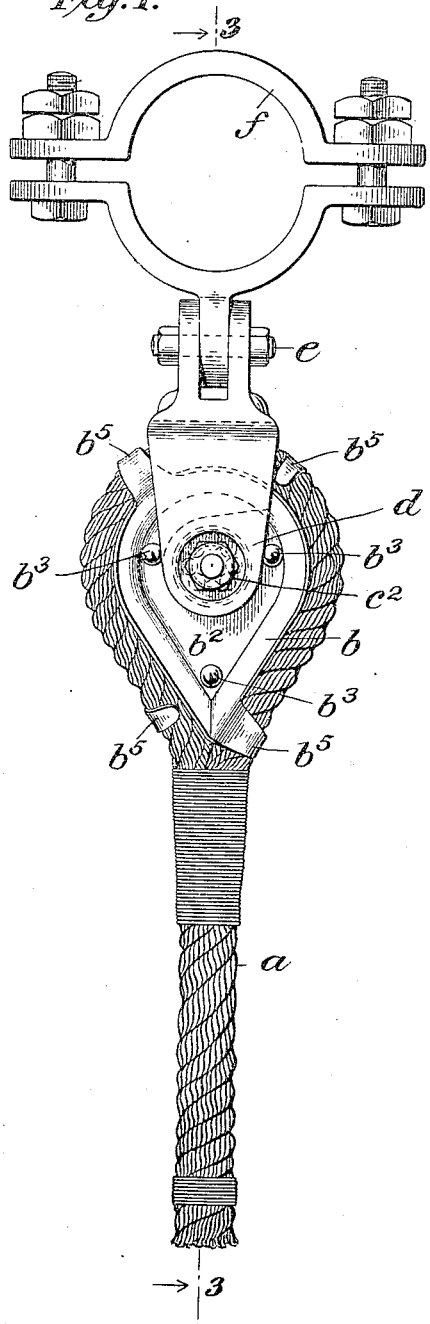
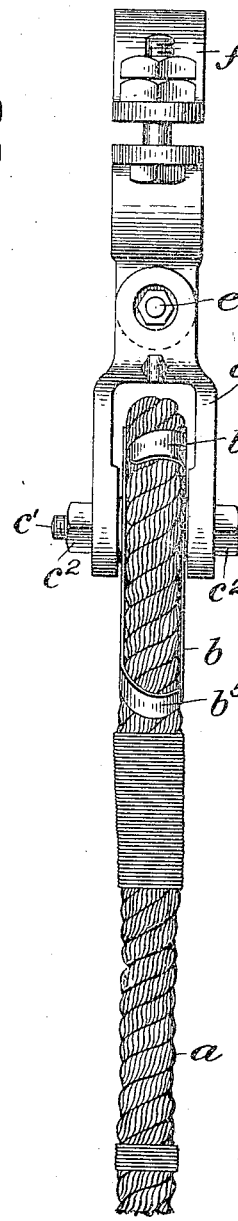
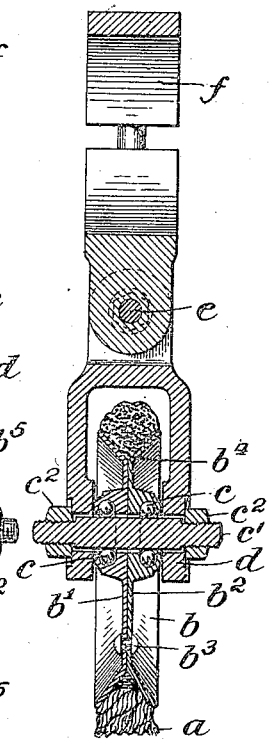
Attest:
Inventor:
Milton B. Reach
by Redding, Kiddle & Greeley
Attys.

UNITED STATES PATENT OFFICE.

MILTON B. REACH, OF CHICOPEE, MASSACHUSETTS, ASSIGNOR TO A. G. SPALDING & BROS., OF JERSEY CITY, NEW JERSEY, A CORPORATION OF NEW JERSEY.

ROPE CONNECTION FOR GYMNASIUM APPARATUS, &c.

No. 838,584.      Specification of Letters Patent.      Patented Dec. 18, 1906.

Application filed September 24, 1906. Serial No. 336,078.

*To all whom it may concern:*

Be it known that I, MILTON B. REACH, a citizen of the United States, residing in Chicopee, in the State of Massachusetts, have invented certain new and useful Improvements in Rope Connections for Gymnasium Apparatus, &c., of which the following is a specification, reference being had to the accompanying drawings, forming a part hereof.

The object of this invention is to provide an improved connection or means of attachment for rope in swings, gymnasium apparatus, and other places of use where the rope is subjected to frequent movement and the wear upon the connection is considerable. Commonly in such uses the rope is spliced or otherwise fastened to a flanged link or other similar device which engages a hook or eye. Such a connection requires constant inspection and notwithstanding this is a constant source of danger to the person using the apparatus.

It is the purpose of this invention to secure a maximum of durability with a minimum of friction at the point where the greatest wear would otherwise occur, so that very little care is required even where the device is in almost constant use, as in swings installed in public playgrounds.

Furthermore, provision is made for the securing of the rope to the device by splicing rather than by the less reliable clamping.

The invention will be more fully explained hereinafter with reference to the accompanying drawings, in which it is illustrated as embodied in a convenient and practical form.

In the drawings, Figure 1 is a view in side elevation of the improved device adapted for application to a pipe-support. Fig. 2 is a view of the same in elevation with the line of sight at a right angle to that of Fig. 1. Fig. 3 is a detail view in section on the plane indicated by the broken line 3 3 of Fig. 1.

The rope $a$ is spliced or otherwise secured to a thimble or cringle $b$, preferably of unequal diameters and conveniently formed of stamped sheet-steel. As shown, it consists of two parts $b'$ and $b^2$, secured together by rivets $b^3$ and forming a channel or bed way $b^4$ of U or V shape in cross-section to accommodate the rope. Spurs $b^5$ are provided on the two parts to be bent over the rope after the splice is made to hold it firmly in the channel and to prevent all possibility of slipping or of the breaking loose of the rope on the cringle through stretching. The cringle is mounted through ball-bearings $c$ upon a stud $c'$, which is secured by nuts $c^2$ in a clevis $d$. The latter is hung by a stud $e$ at right angles to the stud $c'$, so that the clevis may swing in a plane transverse to the plane of the cringle, and thus accommodate the motion of the rope in any direction while holding the ball-bearings of the cringle with the axis always at right angles to the plane in which the rope swings. The clevis may be secured to any convenient support. As shown in the drawings, it is secured to a split collar $f$, which may be clamped upon a pipe-support; but a ceiling-plate or any other convenient supporting device may be employed.

It will be understood that the shape of the cringle may be varied and that various other changes in the form and construction of various parts of the device may be made as different conditions of use suggest without departing from the spirit of the invention.

I claim as my invention—

1. A rope connection for gymnasium apparatus, &c., comprising a cringle to which the rope is secured, a clevis and a stud carried by said clevis and having a bearing for said cringle.

2. A rope connection for gymnasium apparatus, &c., comprising a cringle to which the rope is secured, a clevis and a ball-bearing by which said cringle is supported within the clevis.

3. A rope connection for gymnasium apparatus, &c., comprising a cringle to which the rope is secured, said cringle having spurs bent over the rope and securing the same in the channel of the cringle, a clevis and a stud carried by said clevis and having a bearing for the cringle.

4. A rope connection for gymnasium apparatus, &c., comprising a cringle to which the rope is secured, a clevis for a bearing for the cringle and a support to which the clevis is connected to swing in a plane transverse to the plane of movement of the cringle in the clevis.

This specification signed and witnessed this 17th day of September, A. D. 1906.

MILTON B. REACH.

In presence of—
     H. F. JAMESON,
     D. S. MOODY.